United States Patent
Cherepy et al.

(10) Patent No.: US 10,000,698 B2
(45) Date of Patent: Jun. 19, 2018

(54) TRANSPARENT CERAMIC GARNET SCINTILLATOR DETECTOR FOR POSITRON EMISSION TOMOGRAPHY

(71) Applicants: Lawrence Livermore National Security, LLC, Livermore, CA (US); Siemens Medical Solutions USA, Inc., Malvern, PA (US)

(72) Inventors: Nerine Cherepy, Piedmont, CA (US); Stephen A. Payne, Castro Valley, CA (US); Zachary Seeley, Livermore, CA (US); Peter Carl Cohen, Knoxville, TN (US); Mark S. Andreaco, Knoxville, TN (US); Matthias J. Schmand, Lenior City, TN (US)

(73) Assignee: Lawrence Livermore National Security, LLC, Livermore, CA (US)

(*) Notice: Subject to any disclaimer, the term of this patent is extended or adjusted under 35 U.S.C. 154(b) by 0 days. days.

(21) Appl. No.: 15/064,509

(22) Filed: Mar. 8, 2016

(65) Prior Publication Data
US 2017/0260448 A1   Sep. 14, 2017

(51) Int. Cl.
*G01T 1/24* (2006.01)
*C09K 11/77* (2006.01)
(Continued)

(52) U.S. Cl.
CPC ...... *C09K 11/7774* (2013.01); *C04B 35/6267* (2013.01); *G01T 1/2002* (2013.01);
(Continued)

(58) Field of Classification Search
CPC ... C09K 11/7774; C04B 35/6261; G01T 1/20; G01T 1/2023; G01T 1/2002; G01T 1/2018; G01T 1/202
See application file for complete search history.

(56) References Cited

U.S. PATENT DOCUMENTS 8,268,230 B2   9/2012 Cherepy et al.
8,461,535 B2   6/2013 Kuntz et al.
(Continued)

OTHER PUBLICATIONS

Seeley et al., "Homogeneity of Gd-based garnet transparent ceramic scintillators for gamma spectroscopy", Journal of Crystal Growth, vol. 379, Sep. 15, 2013, pp. 79-83.*
(Continued)

*Primary Examiner* — Marcus Taningco
(74) *Attorney, Agent, or Firm* — Zilka-Kotab

(57) ABSTRACT

In one embodiment, a method includes forming a powder having a composition with the formula: $A_hB_iC_jO_{12}$, where h is 3±10%, i is 2±10%, j is 3±10%, A includes one or more rare earth elements, B includes aluminum and/or gallium, and C includes aluminum and/or gallium. The method additionally includes consolidating the powder to form an optically transparent ceramic, and applying at least one thermodynamic process condition during the consolidating to reduce oxygen and/or thermodynamically reversible defects in the ceramic. In another embodiment, a scintillator includes $(Gd_{3-a-c}Y_a)_x(Ga_{5-b}Al_b)_yO_{12}D_c$, where a is from about 0.05-2, b is from about 1-3, x is from about 2.8-3.2, y is from about 4.8-5.2, c is from about 0.003-0.3, and D is a dopant, and where the scintillator is an optically transparent ceramic scintillator having physical characteristics of being formed from a ceramic powder consolidated in oxidizing atmospheres.

32 Claims, 5 Drawing Sheets

(51) Int. Cl.
    *G01T 1/20*    (2006.01)
    *C04B 35/626*    (2006.01)

(52) U.S. Cl.
    CPC ............ *G01T 1/2018* (2013.01); *G01T 1/249* (2013.01); *C04B 2235/6583* (2013.01)

(56) References Cited

U.S. PATENT DOCUMENTS

| | | | |
|---|---|---|---|
| 8,969,812 B2 | 3/2015 | Yoshikawa et al. | |
| 2010/0294939 A1* | 11/2010 | Kuntz | C04B 35/01 250/361 R |
| 2012/0223236 A1* | 9/2012 | Shah | C09K 11/7774 250/362 |
| 2013/0075628 A1* | 3/2013 | Seeley | C09K 11/7787 250/473.1 |
| 2013/0270482 A1* | 10/2013 | Jiang | C09K 11/7774 252/301.6 R |
| 2016/0170043 A1* | 6/2016 | Andreaco | G01T 1/2002 250/368 |
| 2016/0266260 A1* | 9/2016 | Preston | G01T 1/02 |
| 2017/0014943 A1* | 1/2017 | Sabet | B23K 26/53 |

OTHER PUBLICATIONS

Melcher, C.L., "Perspectives on the future development of new scintillators," Nuclear Instruments and Methods in Physics Research Section A, vol. 537, Issue 1-2, Aug. 23, 2004, pp. 6-14.
Humm et al., "From PET detectors to PET scanners," European Journal of Nuclear Medicine and Molecular Imaging, vol. 30, No. 11, Nov. 2003, pp. 1574-1597.
Yoshikawa et al., "Crystal growth and characterization of Ce:Gd3(Ga,Al)5O12 single crystal using floating zone method in different O2 partial pressure," Optical Materials, vol. 35, Sep. 2013, pp. 1882-1886.
Fielitz et al., "Oxygen Grain-Boundary Diffusion in Polycrystalline Mullite Ceramics," Journal of the American Ceramic Society, vol. 87, Issue 12, 2004, pp. 2232-2236.
Ikesue et al., "Synthesis and Performance of Advanced Ceramic Lasers," Journal of the American Ceramamic Society, vol. 89, No. 6, Apr. 28, 2006, pp. 1936-1944.
Kamada et al., "Scintillator-oriented combinatorial search in Ce-doped (Y,Gd)3(Ga,Al)5O12 multicomponent garnet compounds," Journal of Physics D: Applied Physics, vol. 44, No. 50:505104, Dec. 2011, pp. 1-10.
Kamada et al., "2 inch diameter single crystal growth and scintillation properties of Ce:Gd3Al2Ga3O12," Journal of Crystal Growth, vol. 352, Aug. 2012, pp. 88-90.
Kamada et al., "Crystal Growth and Scintillation Properties of Ce Doped Gd3(Ga,Al)5O12 Single Crystals," IEEE Transactions on Nuclear Science, vol. 59, Oct. 2012, pp. 2112-2115.
Zhao et al., "Characteristics of large-sized Ce:YAG scintillation crystal grown by temperature gradient technique," Journal of Crystal Growth, vol. 253, Jun. 2003, pp. 290-296.
Seeley et al., "Expanded phase stability of Gd-based garnet transparent ceramic scintillators," Journal of Materials Research, vol. 29, No. 19, Oct. 14, 2014, pp. 2332-2339.
Wang et al., "Transparent Ceramics: Processing, Materials and Applications," Progress in Solid State Chemistry, vol. 41, Issues 1-2, May 2013, pp. 20-54.
Cherepy et al., "Scintillators with Potential to Supersede Lanthanum Bromide," IEEE Transactions on Nuclear Science, vol. 56, Jul. 2009, pp. 1-10.
Cherepy et al., "Development of Transparent Ceramic Ce-Doped Gadolinium Garnet Gamma Spectrometers," IEEE Transactions on Nuclear Science, vol. 60, No. 3, Nov. 16, 2012, pp. 1-8.
Tyagi et al., "Effect of Ca2+ Co-Doping on the Scintillation Kinetics of Ce Doped Gd3Ga3Al2O12," IEEE Transactions on Nuclear Science, vol. 61, No. 1, Feb. 2014, pp. 297-300.
Cherepy et al., "High Energy Resolution Transparent Ceramic Garnet Scintillators," SPIE Optical Engineering + Applications, Sep. 2014, pp. 921302-1-921302-6.
Galetta et al., "Coincidence resolution time of two small scintillators coupled to high quantum-efficiency photomultipliers in a PET-like system," EPJ Web of Conferences, vol. 66, No. 10010, Mar. 20, 2014, pp. 1-4.
Iwanowska et al., "Performance of cerium-doped Gd3Al2Ga3O12 (GAGG:CE) scintillator in gamma-ray spectrometry," Nuclear Instruments and Methods in Physics Research A, vol. 712, Feb. 16, 2013, pp. 34-40.
Yamamoto et al., "Development of GAGG depth-of-interaction (DOI) block detectors based on pulse shape analysis," Nuclear Instruments and Methods in Physics Research A, vol. 767, Sep. 10, 2014, pp. 289-295.
Chen et al., "Highly Transparent ZrO2-doped (Ce,Gd)3Al3Ga2O12 ceramics prepared via oxygen sintering," Journal of European Ceramic Society, vol. 35, Jul. 14, 2015, pp. 3879-3883.
International Search Report and Written Opinion from PCT Application No. PCT/US17/21384, dated Apr. 6, 2017.

* cited by examiner

TRANSPARENT CERAMIC GARNET SCINTILLATOR DETECTOR FOR POSITRON EMISSION TOMOGRAPHY

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to scintillators, and more particularly to transparent ceramic garnet scintillator detectors, which may be particularly useful for positron emission tomography (PET).

BACKGROUND

Positron emission tomography (PET) is a powerful and sensitive technique for medical imaging applications. A positron-emitting radionuclide tracer is typically injected into a patient, and the distribution of said tracer within the patient may be quantitatively measured from PET image data. For instance, when the emitted positron meets an electron inside the patient's body, the positron and electron annihilate and produce two 511 keV gamma rays traveling in opposite directions. These oppositely-traveling gamma rays are measured in electronic coincidence by opposing pairs of radiation detectors. Measuring the timing resolution essentially involves an algorithm that "draws a line" between the opposing radiation detectors and which intersects the patient. The timing resolution information may then be employed to (ideally) identify a point in space on this line corresponding to the location at which the positron-electron annihilation occurred in the patient's body. However, in practice, this timing specified region is not a point in space, but rather a line segment, the length of which is determined by the timing performance of the radiation detector and its associated electronics.

Scintillator radiation detectors are often utilized in PET devices. In particular, cerium-doped lutetium orthosilicate, LSO(Ce), and cerium-doped lutetium-yttrium oxyorthosilicate, LYSO(Ce) single crystal scintillators exhibit fast rise and decay times and thus provide the best performance to date for PET applications. However, LSO(Ce) LYSO(Ce) are costly due to their high melting point, requiring costly iridium crucibles and high electrical input, as well as inclusion of costly lutetium as a primary component in the crystal.

SUMMARY

According to one embodiment, a method includes forming a powder having a composition with the formula: $A_hB_iC_jO_{12}$, where h is 3±10%, i is 2±10%, and j is 3±10%, and where A includes one or more rare earth elements, B includes aluminum and/or gallium, and C includes aluminum and/or gallium. The method additionally includes consolidating the powder to form an optically transparent ceramic, and applying at least one thermodynamic process condition during the consolidating to reduce oxygen and/or thermodynamically reversible defects in the ceramic.

According to another embodiment, a radiation detection system includes at least one optically transparent ceramic scintillator having the formula $(Gd_{3-a-c}Y_a)_x(Ga_{5-b}Al_b)_yO_{12}D_c$, where a is from about 0.05 to about 2, b is from about 1 to about 3, x is from about 2.8 to about 3.2, y is from about 4.8 to about 5.2, c is from about 0.003 to about 0.3, and D is a dopant, and where the optically transparent ceramic scintillator has physical characteristics of being formed from a ceramic powder consolidated in oxidizing atmospheres.

According to yet another embodiment, a scintillator includes $(Gd_{3-a-c}Y_a)_x(Ga_{5-b}Al_b)_yO_{12}D_c$, where a is from about 0.05 to about 2, b is from about 1 to about 3, x is from about 2.8 to about 3.2, y is from about 4.8 to about 5.2, c is from about 0.003 to about 0.3, and D is a dopant, and where the scintillator is an optically transparent ceramic scintillator having physical characteristics of being formed from a ceramic powder consolidated in oxidizing atmospheres.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
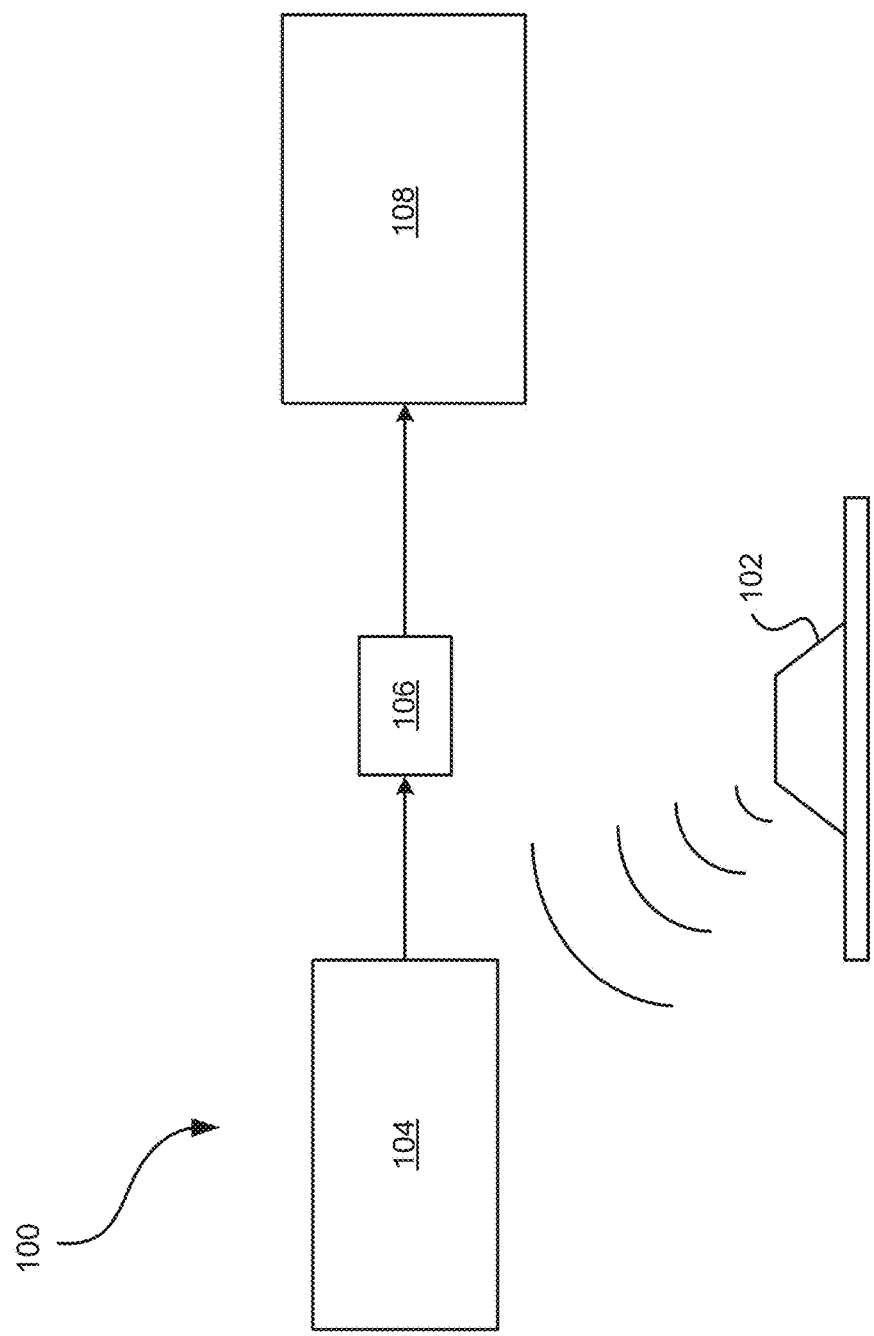
FIG. 1 is a simplified schematic of a spectroscopy system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 10 mm refers to a length of 10 mm±1 mm, resolution of 4% refers to 4±0.4%, etc.

As additionally used herein, a material that is "optically transparent" refers to a material that is substantially free (e.g. >95% free, preferably >99.9% free) of included secondary phases, such that the material is homogenous (e.g.

comprises one-phase). Moreover, optically transparent materials are those through which light propagates uniformly and are capable of transmitting at least 90% of incident light through the bulk of the scintillator part.

The description herein is presented to enable any person skilled in the art to make and use the invention and is provided in the context of particular applications of the invention and their requirements. Various modifications to the disclosed embodiments will be readily apparent to those skilled in the art upon reading the present disclosure, including combining features from various embodiments to create additional and/or alternative embodiments thereof.

Moreover, the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

As discussed previously, current positron emission tomography (PET) imagers use cerium-doped lutetium orthosilicate, LSO(Ce), or cerium-doped lutetium-yttrium orthosilicate, LYSO(Ce) single crystal scintillators due to their fast rise and decay times. However, LSO(Ce) and LYSO(Ce) are costly due to their high melting points, >2000° C., the requirement that they be grown from the melt, and inclusion of lutetium as the primary component.

Moreover, there are distinct disadvantages associated with the use and. fabrication of oxide, garnet, and silicate single crystal scintillators. For instance, such single crystal scintillators may include oxygen related defects that tend to trap and subsequently de-trap charge carriers (electrons or holes) generated in the scintillation process, thereby delaying the rise and decay of the scintillation pulse. Current melt-growth techniques to fabricate oxide, garnet, and silicate single crystals do not mitigate the presence of these oxygen related defects. For instance, melt growth of oxide, garnet, and silicate single crystals typically employs iridium crucibles, from which the crystals are pulled from the melt using the Czochralski method. However, owing to materials compatibility issues, a high concentration of oxygen in the growth atmosphere (which may enhance the diffusion of oxygen ions into the single crystals) cannot be sustained by this method because the iridium metal of the crucible will degrade, leading to failure. Additionally, the diffusion of oxygen ions into single crystals is hampered due to absence of grain boundaries as the entire crystal boule is a contiguous single crystal. Further, such single crystals often exhibit non-uniform doping profiles as the dopants/activators that luminesce tend to segregate axially and radially in the Czochralski growth process.

Embodiments disclosed herein are thus directed to transparent ceramic scintillators. Transparent ceramic scintillators are a class of optically transparent, polycrystalline materials that may be formed with oxide crystalline materials possessing a cubic crystal structure, such that the isotropic refractive index does not refract or reflect the light at grain boundaries, and excellent transparency may be achieved. In preferred approaches, the transparent ceramics disclosed herein are essentially free of residual porosity to achieve high transparency. Since transparent ceramics are fully polycrystalline monoliths that are optically clear, they may replace single crystals in PET scanners and other gamma detectors in various approaches, offering advantages of high mechanical ruggedness and more uniform doping by the activators that luminesce. In particular approaches, embodiments disclosed herein may include a ceramic garnet scintillator having the general formula: $(Gd,Y)_3(Ga,Al)_5O_{12}$ (Ce), where the Gd:Y ratio is greater than 1 (e.g., about 3:1), the Ga:Al ratio is about 1:1 (e.g., 2.2:2.8), and the Ce-doping level substitutes for up to about 5% of the total combined amount of Gd and Y.

In addition, embodiments disclosed herein may be directed to novel methods for treating thermodynamically reversible defects in optically transparent, ceramic scintillators. Thermodynamically reversible defects may include crystal lattice imperfections that may be influenced (e.g., reduced or increased in concentration, alternated or changed, etc.) by applying different thermodynamic process conditions including, but not limited to, temperature, gas atmosphere, pressure, etc. By treating thermodynamically reversible defects in ceramic scintillators, the novel methods disclosed herein may reduce the emission decay thereof, and thus improve the timing resolution of ceramic scintillators for PET devices for example by shortening the emission rise time.

In particular approaches, the novel methods disclosed herein may utilize oxidizing atmospheres during the fabrication of the optically transparent ceramic scintillators to treat oxygen related defects or other thermodynamically reversible defects present therein. For instance, in some approaches, an oxidizing atmosphere may be utilized during consolidation of ceramic nano- and/or micro-particles into a green body with higher density and less porosity. In other approaches, the novel methods may additionally implement a post-anneal step also in an oxidizing atmosphere after consolidation.

The use of transparent ceramic scintillators in the embodiments disclosed herein, instead of single crystal scintillators, is favorable in the pursuit of obtaining low oxygen related defect concentrations, because the incorporation of additional oxide species (usually by way of $O_2$ containing atmospheres) may be highly enabled during the ceramic processing steps (e.g., the aforementioned sintering and/or annealing steps). Such may particularly be the case when the ceramic scintillator material still comprises particles at the nano- or microscale due to their high surface area. It is of note, however, that the oxidation may also be enabled in consolidated ceramics by virtue of the oxide ions' ability to be transported along the micro-structured grain boundaries that exist in the optical parts (e.g., after the elimination of porosity when the scintillator is at full density).

Following are several examples of general and specific embodiments of transparent ceramic garnet scintillator detectors, and/or related systems and methods.

For instance in one general embodiment, a method includes forming a powder having a composition with the formula: $A_h B_i C_j O_{12}$, where h is 3±10%, i is 2±10%, and j is 3±10%, and where A includes one or more rare earth elements, B includes aluminum and/or gallium, and C includes aluminum and/or gallium. The method additionally includes consolidating the powder to form an optically transparent ceramic, and applying at least one thermodynamic process condition during the consolidating to reduce oxygen and/or thermodynamically reversible defects in the ceramic.

In another general embodiment, a radiation detection system includes at least one optically transparent ceramic scintillator having the formula $(Gd_{3-a-c}Y_a)_x(Ga_{5-b}Al_b)_y O_{12}D_c$, where a is from about 0.05 to about 2, b is from about 1 to about 3, x is from about 2.8 to about 3.2, y is from about 4.8 to about 5.2, c is from about 0.003 to about 0.3, and D is a dopant, and where the optically transparent ceramic scintillator has physical characteristics of being formed from a ceramic powder consolidated in oxidizing atmospheres.

In yet another general embodiment, a scintillator includes $(Gd_{3-a-c}Y_a)_x(Ga_{5-b}Al_b)_yO_{12}D_c$, where a is from about 0.05 to about 2, b is from about 1 to about 3, x is from about 2.8 to about 3.2, y is from about 4.8 to about 5.2, c is from about 0.003 to about 0.3, and D is a dopant, and where the scintillator is an optically transparent ceramic scintillator having physical characteristics of being formed from a ceramic powder consolidated in oxidizing atmospheres.

Scintillator-Based Radiation Detector System

Referring now to FIG. 1, a simplified schematic of a scintillation based radiation detector system 100 is shown according to one embodiment. As an option, the radiation detector system 100 may be implemented in conjunction with features from any other embodiment listed herein, such as those described with reference to the other FIGS. Of course, the radiation detector system 100 and others described herein may be used in various applications and/or in permutations which may or may not be specifically described in the illustrative embodiments listed herein. For instance, the radiation detector system 100 may include more or less components than those shown in FIG. 1, in various approaches.

As shown in FIG. 1, the radiation detector system 100 comprises a scintillator material 102, such as of a type described herein, and which is referred to herein interchangeably as a scintillator. The radiation detector system 100 also includes a photodetector 104, such as a photomultiplier tube, a silicon photomultiplier, photodiode, or other device/transducer known in the art, which can detect and register the magnitude of the light emitted from the scintillator 102. The radiation detector system 100 is preferably configured to register x-rays and gamma rays, as well as being able to partially or completely determine the photon energy of said forms of radiation.

The scintillator 102 produces light pulses upon occurrence of an event, such as a gamma ray, an x-ray, or other radiation producing ionization in the scintillator 102. For instance, as a gamma ray traverses the scintillator 102, a pulse of visible photons is released from the scintillator 102. The light pulses are detected by the photodetector 104 and transduced into electrical signals that correspond to the magnitude of the pulses. The type of radiation can then be determined by analyzing the histogram of the integrated light pulses and thereby identifying the gamma ray energies absorbed by the scintillator.

In some embodiments, the radiation detector 100 may be, further comprise, or be coupleable/coupled to, a preamplifier, a multi-channel analyzer, and/or digitizer (not shown in FIG. 1).

In other embodiments, the radiation detector 100 may include a processing device 106 configured to process pulse traces output by the photodetector 104, which correspond to light pulses from the scintillator 102. In some approaches, the processing device 106 may be further configured to generate radiological image data based on the pulse traces output by the photodetector 104.

In additional approaches, radiation detector 100 may include a processing device that receives data from a photodetector that is not permanently coupled to the processing device. Illustrative processing devices include microprocessors, field programmable gate arrays (FPGAs), application specific integrated circuits (ASICs), computers, etc.

The result of the processing may be output and/or stored. For example, the result may be displayed on a display device 108 in any form, such as in a histogram of the number of counts received against the total light from the scintillator or derivative thereof.

In some approaches, the radiation detector system 100 may be a positron emission topography (PET) system. In such approaches, the PET system ay include a plurality of opposing scintillator voxels, where each voxel may have a dimension ranging from about $(1-40) \times (1-40) \times (10-50)$ mm$^3$.

In other approaches, the radiation detector system 100 may be an X-ray imaging device, such as a Computer Tomography (CT) device. In yet more approaches, the radiation detector system 100 may be a PET/CT device. In further approaches, the radiation detector system 100 may be selected from the group consisting of: a CT system; a PET system; a single-photon emission computed tomography system (SPECT); and combinations thereof.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

Portions of the invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc.

Scintillator Materials

In various approaches, a scintillator (e.g., scintillator 102 in FIG. 1) may be a ceramic comprising optically transparent, polycrystalline materials. In preferred approaches, the scintillator may comprise a ceramic garnet composition.

In particular approaches, the scintillator may have a ceramic garnet composition comprising cations with dodecahedral (A), octahedral (B) and tetrahedral (C) coordination in the formula $A_3B_2C_3O_{12}$, where the stoichiometric amounts of A, B and C may be about 3, 2, and 3, respectively. In some approaches, the garnet composition may be highly phase-stable via use of inter-substitutional ions, where one or more of the A, B or C metal ions may be capable of substituting on another of these three sites. For instance, U.S. Pat. No. 8,461,535, which is herein incorporated by reference in its entirety, describes the use of scandium, yttrium, and/or gallium ions as a phase stabilizer in rare earth aluminum garnets.

As noted above, the garnet composition of the scintillator may be expressed by the formula $A_3B_2C_3O_{12}$, were A is the dodecahedral site, B is the octahedral site, and C is the tetrahedral site. In some approaches, the garnet composition may include that of a rare earth aluminum garnet, where A includes a rare earth element or a mixture of rare earth elements (e.g., yttrium (Y), gadolinium (Ga), lutetium (Lu), lanthanum (La), terbium (Tb), praseodymium (Pr), neodymium (Nd), cerium (Ce), samarium (Sm), europium (Eu), dysprosium (Dy), holmium (Ho), erbium (Er), ytterbium (Yb), and/or combinations thereof), and B and C are aluminum. In more approaches, the garnet composition may include that of a rare earth gallium garnet, where A includes a rare earth element or a mixture of rare earth elements, and B and C are both gallium and aluminum.

Not all rare earth elements form a cubic garnet crystal structure with aluminum and gallium, even under the correct stoichiometric ratio. This is due to the requirement that the ratio of ionic radii of dodecahedral to octahedral to tetrahedral being limited to an optimal range for the cubic garnet crystal structure. An example of a garnet composition with poor phase stability is $Gd_3Al_5O_{12}$, which commonly forms a mixture of garnet and perovskite phases and is undesirable for forming transparent parts. However, Gd-based garnets are of particular interest for scintillation because they offer a high effective atomic number for gamma ray interaction, and have been found to have high light yields.

To overcome phase stability issues with Gd-based garnets, a preferred composition for the scintillator may comprise gadolinium and yttrium primarily on the A site, where yttrium serves as an inter-substitutional ion on the A and B sites, and the gallium and aluminum serve as inter-substitutional ions on the B and C sites, a composition referred to as GYGAG. The inclusion of the inter-substitutional ions relaxes the requirement on the stoichiometry of the starting materials, such that a broader range of compositions may be fabricated into transparent ceramics without the undesirable inclusion of secondary phases (e.g., perovskite structures).

In additional approaches, the garnet composition (e.g., GYGAG and others disclosed herein) of the scintillator may comprise one or more dopants, "D" (also referred to herein as activator ions), which may also be primarily located on the A site. These dopants, D, may be configured to capture energy imparted to the scintillator and emit light in the ultraviolet, visible or infrared region. In general, the emission generated by an activator is characteristic of the electronic structure of said activator. In various approaches, the one or more activator ions may be particularly configured to modify the output scintillation light compared to that of the pure scintillator (i.e., a scintillator without any activator ions but is otherwise identical except for a possible decrease in the amount of its "A" ions to maintain stoichiometry) by one or more of the following: changing the emission wavelength or decay time, increasing or decreasing the amount of light emitted, and improving the spectral resolution of the scintillator as a gamma or x-ray detector. Suitable activator ions may include, but are not limited to, $Tl^+$, $Cu^+$, $Ag^+$, $Au^+$, $Pb^{2+}$, $Bi^{3+}$, $In^+$, $Sn^{2+}$, $Sb^{3+}$, $Ce^{3+}$, $Pr^{3+}$, $Eu^{2+}$, $Yb^{2+}$, $Nb^{5+}$, $Ta^{5+}$, $W^{6+}$, $Sr^{2+}$, and combinations thereof. Additionally, certain ions can be used to enhance the scintillation performance of garnet compositions. These ions can be added along with the activators listed above, while maintaining the original stoichiometry of the compositions. These ions are, but not being limited to: B, Ba, Sr, Ca, Mg, or any combinations thereof.

In approaches where the garnet composition (e.g., GYGAG and other disclosed herein) of the scintillator comprises a $Ce^{3+}$ dopant, a small concentration of $Ce^{4+}$ (e.g., from about 0% up to about 50% of the $Ce^{3+}$ doping concentration) may also be included within the garnet composition. When excited charge carriers (electrons or holes) are produced in the scintillator by incident ionizing radiation, electron and holes may be trapped at oxygen and/or other thermodynamically reversible defects, if present, as well as directly on the $Ce^{3+}$ or $Ce^{4+}$. When an electron-hole pair is trapped on $Ce^{3+}$, it promotes the activator in the excited state, resulting in scintillation emission. Without wishing to be bound by any particular theory, it is believed that a small concentration of $Ce^{4+}$ may eliminate afterglow in the scintillator by allowing electrons that are trapped on defects (such as oxide related defects) to non-radiatively recombine (i.e., without the generation of light) rather than being subsequently released from other traps to eventually arrive at the $Ce^{3+}$ dopants/activators on timescales that can lengthen both rise and decay times of the dopant/activator emission. Inclusion of $Ce^{4+}$ in addition to the $Ce^{3+}$ dopant may be achieved, in one approach, by adding a small concentration of one or more divalent aliovalent dopants, such as $Mg^{2+}$, $Ca^{2+}$, $Sr^{2+}$, $Ba^{2+}$, etc., to the garnet composition of the scintillator, thereby resulting in formation of a commensurate concentration of $Ce^{4+}$ to maintain charge balance in the composition. In an alternative approach, formation of the $Ce^{3+}$ doped garnet composition may include an annealing step in which the composition is heated in air or an oxygen containing atmosphere to produce a small $Ce^{4+}$ concentration is the composition. This annealing step may also reduce the presence of the oxygen and/or other thermodynamically reversible defects present in the garnet composition, as discussed in greater detail, infra.

In a preferred approach, the garnet composition of the scintillator may have the formula $(Gd_{3-a-c}Y_a)_x(Ga_{5-b}Al_b)_yO_{12}D_c$, where a is from about 0.05 to about 2; b is from about 1 to about 3; x is from about 2.8 to about 3.2; y is from about 4.8 to about 5.2; and c is from about 0.003 to about 0.3. The Gd:Y ratio may preferably be greater than one, and more preferably be a ratio of about 3:1 in some approaches. The Ga:Al ratio may preferably be about 1:1, such as 2.5:2.5, in more approaches. In further approaches, the dopant, D, may preferably substitute for about 0.1 to about 10% of the total combined amount of Gd and Y. In yet more approaches, the dopant D may be $Ce^{3+}$, or a combination of $Ce^{3+}$ and $Ce^{4+}$. In approaches where the dopant D includes $Ce^{3+}$, the level/degree of transparency of the scintillator may be controlled based on the amount of $Ce^{3+}$ therein. Similarly, in approaches where the dopant D includes a combination of $Ce^{3+}$ and $Ce^{4+}$, the level/degree of transparency of the scintillator may be controlled based on the amount of at least one of the $Ce^{3+}$ and. $Ce^{4+}$ therein.

In one particularly preferred approach, the garnet composition may be $Gd_{1.49}Y_{1.49}Ce_{0.02}Ga_{2.20}Al_{2.80}O_{12}$, which has been found to be especially phase stable and produce a high light yield scintillator. The (Gd,Y) to (Ga, Al) ratio may varied over a limited range, while still maintaining stability.

In additional approaches, the scintillator, e.g., having any of the garnet compositions disclosed herein, may be sintered from powders, never melted, and grown as an optically transparent polycrystalline monolith/body, where the length of at least one dimension of scintillator is in a range from about 1 mm to about 12 inches.

In some approaches, the scintillator, e.g., having any of the garnet compositions disclosed herein, may be a radiation detection in a PET device. In other approaches, said scintillator may be a radiation detection in a Computed Tomography (CT) device, or other X-ray imaging device. In yet other approaches, the said scintillator may be a radiation detector in a PET/CT and/or SPECT devices.

In various approaches, the scintillator, e.g., having any of the garnet compositions disclosed herein, may exhibit a rise time, decay time, and/or coincident timing resolution about equal or superior to cerium-doped lutetium orthosilicate, LSO(Ce), and cerium-doped lutetium-yttrium orthosilicate, LYSO(Ce), single crystal scintillators.

In preferred approaches, the scintillator, e.g., having any of the garnet compositions disclosed herein, may exhibit a rise time component of less than or equal to about 10 ns, preferably less than or about equal to about 4 ns, and more preferably less than or equal to about 1 ns. In further preferred approaches, the scintillator, e.g., having any of the garnet compositions disclosed herein, may have a coincident timing resolution of about 400 ps or less, and more preferably about 250 or less.

Exemplary Methods of Making the Scintillator Material

Figure 2:
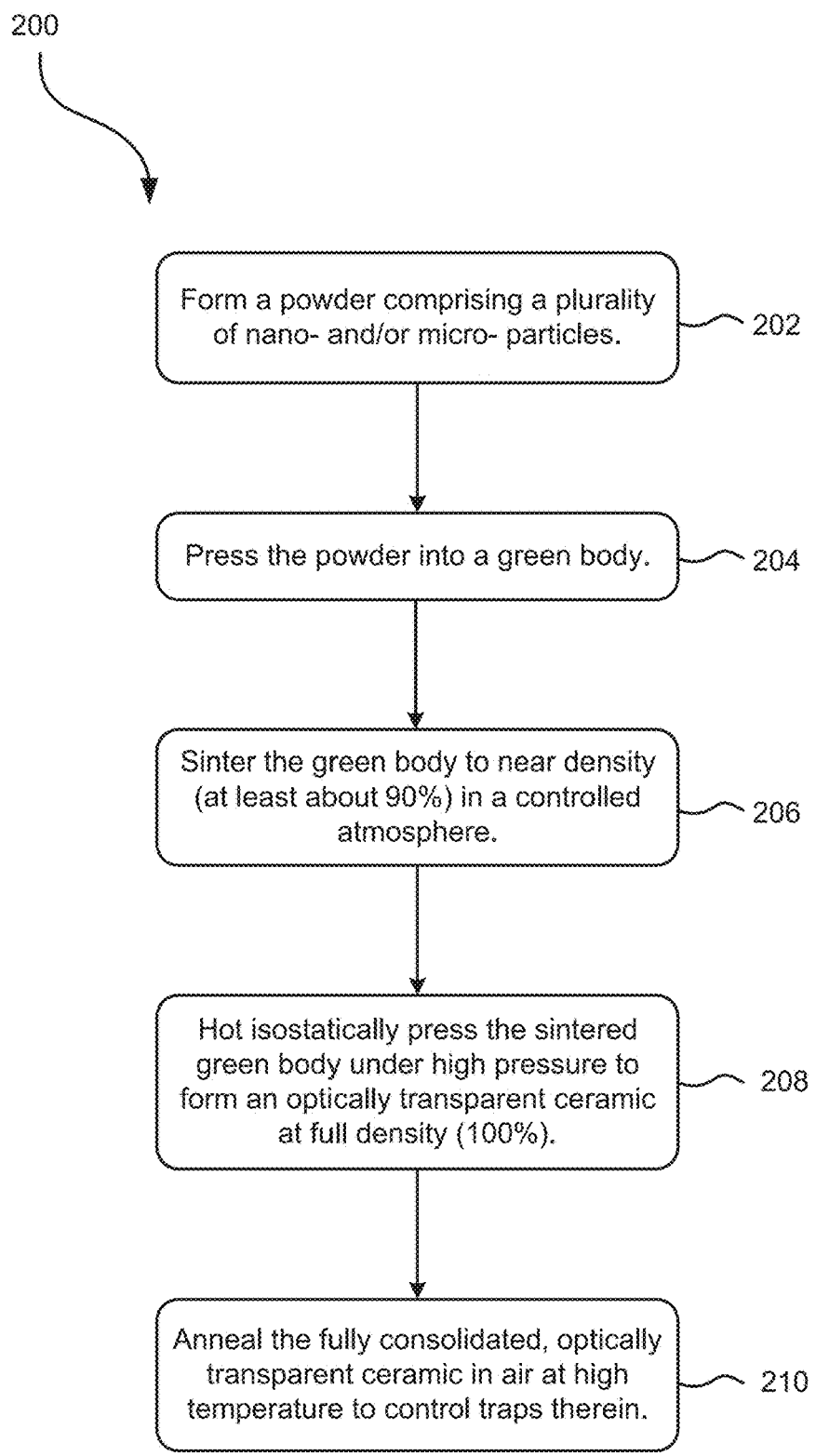
FIG. 2 is a flowchart of a method for forming an optically transparent, ceramic scintillator, according to one embodiment.

FIG. 2 provides a non-limiting, exemplary method 200 of making an optically transparent, ceramic scintillator, according to one embodiment. The method 200, and other presented herein, may be carried out in any desired environment. Moreover, more or less operations than those shown in FIG. 2 may be included in the method 200, according to various embodiments. It should also be noted that any of the aforementioned features of the scintillators described herein may be used in any of the embodiments described in accordance with the various methods.

As shown in FIG. 2, the method 200 includes first forming a powder comprising a plurality of nano- and/or micro-particles. See operation 202. In various approaches, the particles may be formed via flame-spray pyrolysis of one or more liquid precursor materials, combustion synthesis processes, precipitation from one or more liquid solution by changing the pH of said solution(s), sol-gel technology synthesis processes, or other such suitable technique as would become apparent to one skilled in the art upon reading the present disclosure. In some approaches, the powder may be characterized by a mean particle diameter in a range from about 5 nm to about 1000 nm. In more approaches, the particles may be subject to at least one processing step, such as milling, to achieve particles with a particles size of about 500 microns or less. In yet more approaches, the powder may include particles that are substantially uniform in shape and size, and which may be spherical or substantially spherical in shape. In preferred approaches, the powder may exhibit low agglomeration tendencies so as to maintain a fine uniform powder.

In various approaches, the powder may have a garnet crystal formula $A_3B_2C_3O_{12}$, were A is the dodecahedral site, B is the octahedral site, and C is the tetrahedral site. In particular approaches, A may include gadolinium and yttrium and B and C may each include gallium and aluminum.

In additional approaches, the powder may include a dopant configured to act as an activator ion, where the dopant may be selected from the group consisting of: $Tl^+$, $Cu^+$, $Ag^+$, $Au^+$, $Pb^{2+}$, $Bi^{3+}$, $In^+$, $Sn^{2+}$, $Sb^{3+}$, $Ce^{3+}$, $Pr^{3+}$, $Eu^{2+}$, $Yb^{2+}$, $Nb^{5+}$, $Ta^{5+}$, $W^{6+}$, and combinations thereof. The total amount of the dopants in the nanopowder may be about 10 at. % or less in some approaches.

In numerous approaches, the powder composition may have the formula $(Gd_{3-a-c}Y_a)_x(Ga_{5-b}Al_b)_yO_{12}Ce_c$, where a is from about 0.05 to about 2; b is from about 1 to about 3; x is from about 2.8 to about 3.2; y is from about 4.8 to about 5.2; and c is from about 0.003 to about 0.3. The Gd:Y ratio may preferably be greater than one, and more preferably be a ratio of about 3:1 in some approaches. The Ga:Al ratio may preferably be about 1:1, such as 2.5:2.5, in more approaches. In further approaches, the Ce dopant (which may include $Ce^{3+}$, or include a combination of $Ce^{3+}$ and $Ce^{4+}$) may preferably substitute for about 0.01 to about 10% of the total combined amount of Gd and Y.

In approaches where the powder includes cerium as a dopant, the method 200 may include optional steps to control the cerium valence state. As discussed previously, cerium may exist as $Ce^+$ and $Ce^{4+}$, and the relative population of these species may result in significant differences in the scintillation mechanism. For instance, electrons and holes may be trapped on defects (such as oxide related defects and/or other thermodynamically reversible detects) in a scintillator, and subsequently released to arrive at the $Ce^{3+}$ dopants/activators on timescales that may lengthen the rise and decay times of the dopant/activator emission. This delayed scintillation response (afterglow) may be mitigated and/or eliminated in some approaches by forming a small concentration of $Ce^{4+}$ within the $Ce^{3+}$ doped ceramic. Accordingly, the method 200, in one optional approach, may include adding a small concentration of one or more divalent aliovalent dopants, such as $Mg^{2+}$, $Ca^{2+}$, $Sr^{2+}$, $Ba^{2+}$, etc., to the $Ce^{3+}$ doped garnet composition of the scintillator, thereby resulting in formation of a commensurate concentration of $Ce^{4+}$ to maintain charge balance in the composition. An alternative, optional process for forming $Ce^{4+}$ may involve an annealing step that includes heating in air or an oxygen containing atmosphere, as discussed, infra.

As also shown in FIG. 2, the method 200 includes pressing the powder into "green body." See operation 204. To form a green body according to some approaches, the powder may be dispersed in a dispersant (e.g., polyethylene glycol (PEG)), which may include an optional binder. Dispersion may be accomplished by high shear mixing, ultra-sonication, and other such suitable process as would become apparent to a skilled artisan upon reading the present disclosure. Conditions such as temperature, pH, etc. of the suspension may be controlled according to methods known in the art.

In additional approaches, the slurry may further be spray-dried to confer an advantageously even distribution of agglomerates for subsequent pressing and/or sintering as will be discussed in detail below. In one exemplary approach, spray-drying may include atomizing the slurry in an inert atmosphere at a temperature of approximately 200° C. In further approaches, the nano- or micro-particles of the powder particles may be coated with one or more organic compounds to facilitate uniform agglomerate distribution. In still further approaches, the slurry may be passed through a filter or sieve, e.g., preferably a filter or sieve having a pore diameter less than or equal to about 50 μm. Filtering the slurry may be especially effective in constricting particle agglomerate size to a desired range.

In various approaches, it may be advantageous to press the slurry into a pre-formed configuration before sintering, e.g., by warm pressing in a carbon die. Pressing the slurry under heat prior to sintering may be particularly advantageous in approaches where particles are coated with organics in forming the slurry composition as described above, because heating the slurry during pressing permits organics to flow freely and evaporate out of the slurry solution. In some approaches, warm pressing may be performed by subjecting the spray-dried powders to pressures of about 50-400 MPa to form the green body.

In additional approaches, heat may be applied during and/or after the pressing, e.g. by incubating the die containing the slurry in an environment comprising a vacuum atmosphere at temperatures of approximately 900-1100° C. or more.

In more approaches, pre-sintering processes may include calcination of the slurry and/or green body at temperatures ranging from about 500° C. to about 1500° C., for example to completely remove organic compounds therefrom.

In some approaches, the resulting green body formed after the pressing and calcination steps may have a density of about 60%.

As further shown in FIG. 2, the method 200 may include sintering the green body to about near density (e.g., a density of about 90% or more). See operation 206. In some approaches, the green body is sintered in a controlled atmosphere. More preferably, the green body may be sintered in substantially pure oxygen, or oxygen combined with one or more noble gases. In various approaches, the sintering process may occur in a controlled atmosphere at a temperature of at least about 1200° C., or more preferably at a temperature of about 1600° C.

In operation 208, the sintered body may be subsequently heated under pressure of more than about 500 atmospheres and more preferably about 2000 atmospheres (equivalent to about 30,000 psi or about 200 MPa). In this step, known as hot isostatic pressing (HIP-ing), the remaining pores are forced to closure so that the scintillator optic becomes essentially transparent.

As a final processing step, the transparent ceramic may be annealed in air or oxygen containing atmosphere at a temperature ranging from about 1000° C. to about 1900° C. See operation 210. In preferred approaches, the transparent ceramic may be annealed at a temperature of about 1700° C.

It is of note that that sintering and/or annealing the ceramic material in air and/or other oxygen containing atmosphere may reduce oxygen related detects and/or other thermodynamically reversible defects in the ceramic to the lowest achievable concentrations, and thus may be a desirable process for achieving crystalline perfection thereof. It is further of note that sintering and/or annealing the ceramic material in air or other oxygen containing atmosphere may also help prevent gallium evaporation. Additionally, in approaches where transparent ceramic includes $Ce^{3+}$, annealing the fully consolidated, optically transparent ceramic in an oxidizing atmosphere may generate $Ce^{4+}$.

While not shown in FIG. 2, the consolidated, optically transparent ceramic may be optically polished.

Figure 3:
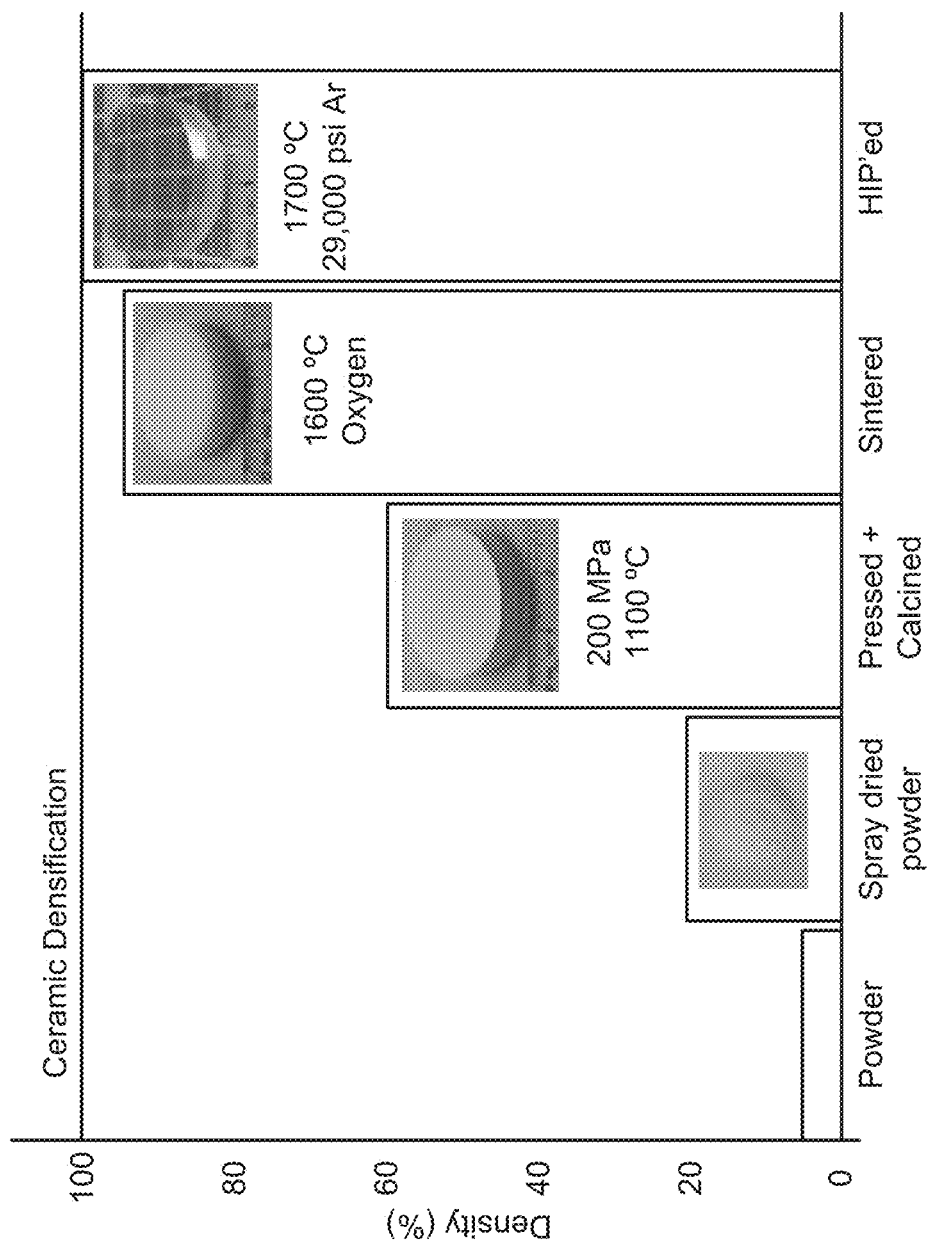
FIG. 3 is a chart of exemplary processing steps for forming an optically transparent, ceramic scintillator, as well as the density of the scintillator at the various stages of manufacture, according to one embodiment. Note that in FIG. 3, HIP stands for "hot isostatic pressing".

FIG. 3 provides a chart illustrating exemplary processing steps (such as those described above in FIG. 2) for forming an optically transparent, ceramic garnet scintillator, as well as the density of the scintillator at the various stages of manufacture.

EXPERIMENTAL RESULTS AND COMPARATIVE EXAMPLES

Several illustrative experimental results and comparative examples associated with the ceramic garnet scintillators described herein are provided below, as well as methods of making the same. It is important to note that these experimental results and comparative examples are in no way limiting, and are provided for illustration purposes only.

Six GYGAG(Ce) ceramic scintillator samples (Samples A-F) were fabricated using a single batch of GYGAG(Ce) nanopowder. The six GYGAG(Ce) ceramic scintillator samples were prepared in exactly the same way using the processing steps described in FIG. 2, except for that each sample was subject to different sintering and/or annealing conditions. For instance, Samples A-C were each sintered under vacuum, whereas Samples D-F were each sintered in pure $O_2$. After sintering, all the samples attained about equivalent transparency and appeared similar by eye in room light. One each of the vacuum and oxygen sintered samples (i.e., Samples B and E) were then annealed in air at about 1600° C., and one each of the vacuum and oxygen sintered samples (i.e., Samples C and F) were then annealed under vacuum at about 1600° C. For clarity the sintering/annealing steps performed for each sample may be noted as follows, where "vac" is "vacuum":

Sample A: Vac/None
Sample B: Vac/Air
Sample C: Vac/Vac
Sample D: $O_2$/None
Sample E: $O_2$/Air
Sample F: $O_2$/vac.

To observe the presence of afterglow, Samples A-F were briefly illuminated with a 254 nm mercury lamp and photographed in the dark about 1 second after turning off the ultraviolet lamp. It was surprisingly and unexpectedly found that that the air-annealed samples (i.e., Samples B and E) did not exhibit afterglow, whereas the vacuum anneal increased afterglow for the vacuum sintered sample (i.e., Sample C) and decreased afterglow for the oxygen sintered sample (i.e., Sample F). The samples that were not annealed (i.e., Samples A and D) each exhibited afterglow.

The rise times and the coincident timing resolution of Samples A-F was also measured, and is summarized in Table 1, below. It was also surprisingly and unexpectedly found that the air-annealed samples (i.e., Samples B and E) exhibited rise times and coincident timing resolution suitable for use in PET scanners, for which <400 ps is likely required, <300 ps is preferable, and <250 ps is most preferable.

TABLE 1

| | Sample | | | | | |
|---|---|---|---|---|---|---|
| | A (Vac/None) | B (Vac/Air) | C (Vac/Vac) | D ($O_2$/None) | E ($O_2$/Air) | F ($O_2$/Vac) |
| Rise time (ns) | 8.8 | 8.4 | 9.4 | 14.7 | 5 | 11.2 |
| Timing resolution (ps) | 505 | 333 | 486 | 500 | 240 | 360 |

Figure 4:
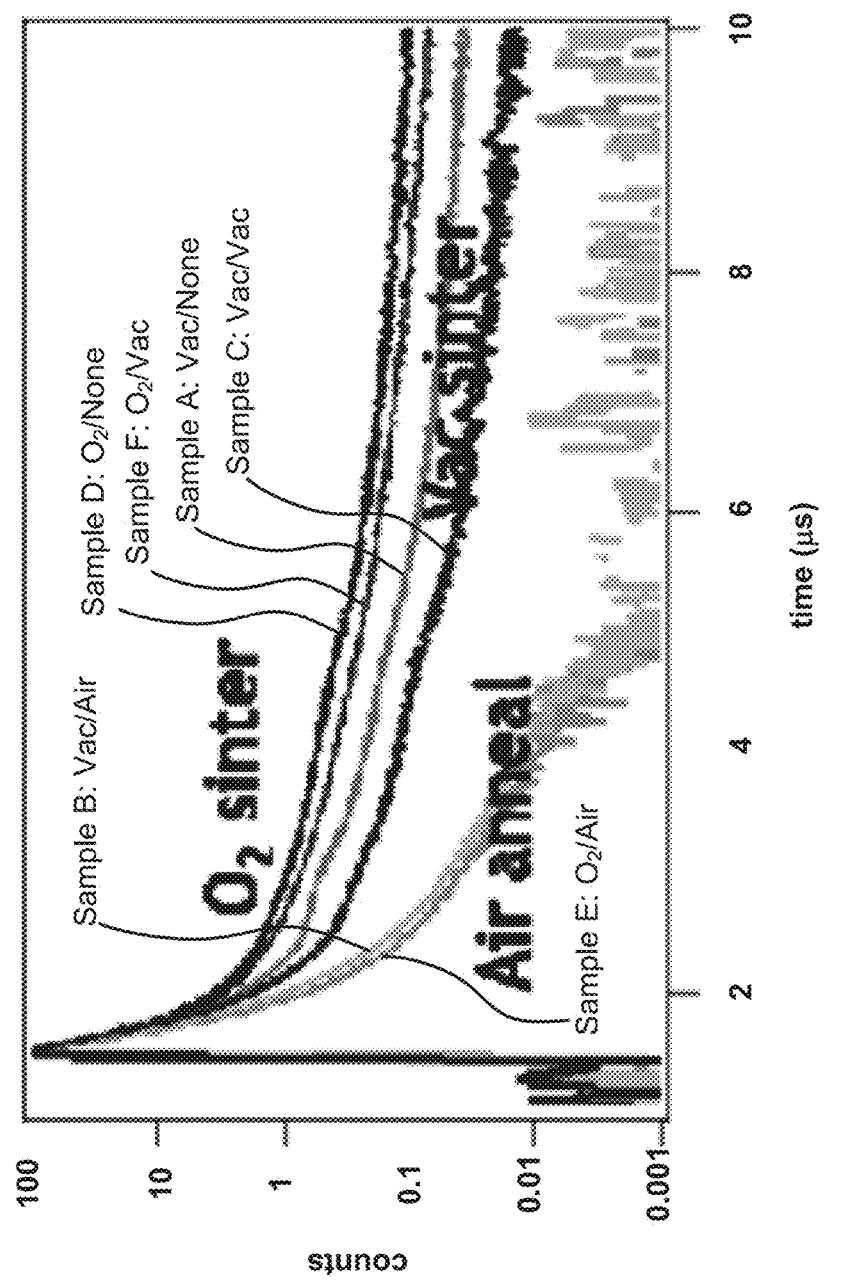
FIG. 4 is a plot of decay traces acquired with Cs-137 gamma excitation for various optically transparent, ceramic scintillators, where the sintering/annealing steps are denoted on the figure (vac=vacuum).

FIG. 4 illustrates the decay traces for Samples A-F acquired with Cs-137 gamma excitation. It was again surprisingly and unexpectedly found that the reduction in afterglow in Samples A-F strongly correlated with shorter decays on the micro-second timescale, as shown in FIG. 4. The decays consist of several components: a fast component with a decay of about 100 ns and which is assigned to the $Ce^{3+}$ decay; a medium component with a decay of about 500 ns and which is assigned to energy migration via the $Gd^{3+}$ sublattice; and a slow component with a decay of about 1-5 µs, thought to be due to shallow traps that can be accessed via hopping of carriers to and from the conduction band. It is of note that this third component is missing from the decays acquired for the air annealed samples. The fastest decays correspond to the air-annealed samples (i.e., Samples B and F), however, the best energy resolution of the photopeak is obtained for the vacuum sintered samples with either no anneal (i.e., Sample A) or a vacuum anneal (i.e., Sample C). In other words, the oxygen-sinter and air-anneal treatments were found to improve the time-resolution at the "cost" of degraded energy resolution (for which lower values are better), which renders the scintillators fabricated in this manner more suitable for use in PET scanners rather than for spectroscopic identification of radioactive isotopes.

Figure 5:
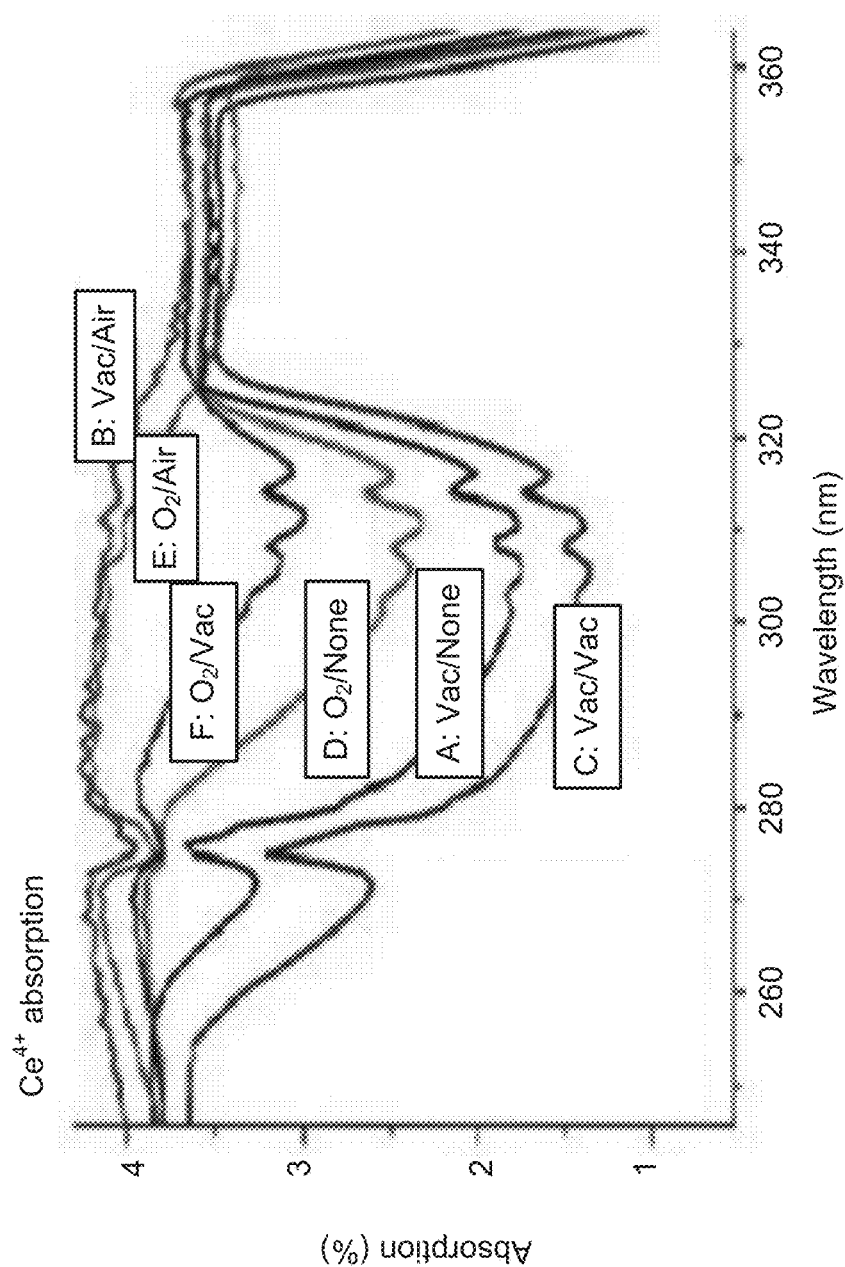
FIG. 5 is a plot of the $Ce^{4+}$ optical absorption spectra for various optically transparent, ceramic scintillators.

FIG. 5 is the UV absorption spectrum of Samples A-F. The feature in the UV absorption spectrum near 300 nm is known to be due to the $Ce^{4+}$ ions, and therefore serves as a measure of its content in the samples. It was again surprisingly and unexpectedly found that most significant $Ce^{4+}$ absorbance was observed for the air-annealed samples (i.e., Samples B and F), with a noticeable enhancement for the $O_2$-sintered samples (i.e., Samples D-F).

All of the above features mentioned in relation to FIGS. 4 and 5 (e.g., observance of afterglow, observance of $Ce^{4+}$ absorbance, effective decay (defined as the time to 1% of initial intensity), and resolution obtained at 662 keV) is summarized in Table 2 below.

TABLE 2

|  | Sample | | | | | |
| --- | --- | --- | --- | --- | --- | --- |
|  | A (Vac/None) | B (Vac/Air) | C (Vac/Vac) | D ($O_2$/None) | E ($O_2$/Air) | F ($O_2$/Vac) |
| Afterglow observed? | High | Low | High | High | Low | Medium |
| $Ce^{4+}$ observed? | None | High | None | Low | High | Low |
| Effective decay (µs) | 0.74 | 0.76 | 0.60 | 1.2 | 0.49 | 1.5 |
| Resolution (%) | 5.4 | 8.6 | 5.2 | 6.0 | 7.5 | 6.4 |

Applications and Uses

Embodiments of the present invention may be used in a wide variety of applications, and potentially any application in which detection of gamma rays, x-rays, charged particles, etc. is useful.

Illustrative uses of various embodiments of the present invention include, but are not limited to, applications requiring radiation detection. Medical imaging applications, including positron emission tomography (PET), time of flight (TOF) PET; Computed Tomography (CT) and other X-ray imaging techniques, combined PET/CT techniques SPECT, SPECT/CT, etc., are a few such examples.

For applications pertaining to radiation detection, such as those discussed directly above, any of the scintillators described herein may be employed in a radiation detector. In particular approaches, this radiation detector may include a means of reading—of detecting the light response of the scintillator and registering the magnitude of the light yield by employing a photomultiplier tube, silicon photomultiplier, photodiode, or any transducer configured to respond to the scintillation light. This radiation detector may ultimately produce a pulse height spectrum, where the light response is presented as a histogram of the number of counts collected within each bin of light yield generated by the scintillator. Moreover, in preferred approaches, such a radiation detector is configured to register x-rays and/or gamma rays, and is also configured to partially or completely distinguish between these particular forms of radiation and approximately determine the energy of the gamma or x-ray photon.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    forming a powder comprising a composition with the formula: $A_h B_i C_j O_{12}$, wherein h is 3 ±10%, i is 2±10%, and j is 3±10%, wherein A includes one or more rare earth elements, B includes aluminum and/or gallium, and C includes aluminum and/or gallium;
    consolidating the powder to form an optically transparent ceramic;
    applying at least one thermodynamic process condition during the consolidating to reduce oxygen related defects and/or thermodynamically reversible defects in the ceramic; and
    annealing the optically transparent ceramic in an oxygen containing atmosphere at a temperature ranging from about 1000° C. to about 1900° C.

2. The method as recited in claim 1, wherein A is selected from the group consisting of: yttrium, gadolinium, lutetium, lanthanum, terbium, praseodymium, neodymium, cerium, samarium, europium, dysprosium, holmium, erbium, ytterbium, and combinations thereof.

3. The method as recited in claim 1, wherein A comprises gadolinium (Gd) and yttrium (Y), wherein a ratio of Gd to Y is in a range from about 1:1 to about 10:1.

4. The method as recited in claim 3, wherein the composition comprises at least one dopant configured to act as an activator, wherein the dopant is selected from the group consisting of: $Cu^+$, $Ag^+$, $Au^+$, $Pb^{2+}$, $Bi^{3+}$, $In^+$, $Sn^{2+}$, $Sb^{3+}$, $Pr^{3+}$, $Yb^{2+}$, $Nb^{5+}$, $Ta^{5+}$, $W^{6+}$, $Ce^{3+}$ and combinations thereof.

5. The method as recited in claim 4, wherein the dopant is present in an amount ranging from about 0.01% to about 10% of a total combined amount of Gd and Y.

6. The method as recited in claim 1, wherein the composition comprises the formula $(Gd_{3-a-c}Y_a)_x(Ga_{5-b}Al_b)_yO_{12}D_c$, wherein a is from about 0.05 to about 2, b is from about 1 to about 3, x is from about 2.8 to about 3.2, y is from about 4.8 to about 5.2, c is from about 0.003 to about 0.3, and D is a dopant.

7. The method as recited in claim 6, wherein D includes cerium.

8. The method as recited in claim 7, further comprising forming $Ce^{4+}$ in the optically transparent ceramic, wherein from 0% to about 50% of the cerium in the optically transparent ceramic is $Ce^{4+}$.

9. The method of claim 6, wherein at least one divalent aliovalent dopant is added to the composition prior to consolidating the powder to form the optically transparent ceramic.

10. The method as recited in claim 9, wherein the divalent aliovalent dopant is selected from the group consisting of: $Mg^{2+}$, $Sr^{2+}$, $Ba^{2+}$, $B^{3+}$ and combinations thereof.

11. The method as recited in claim 1, wherein forming the powder comprises flame spray pyrolysis of one or more liquid precursor materials.

12. The method as recited in claim 1, wherein forming the powder comprises a combustion synthesis process.

13. The method as recited in claim 1, wherein forming the powder comprises at least one processing step to achieve particles having a size less than about 500 microns, the at least one processing step comprises milling the particles.

14. The method as recited in claim 1, wherein the thermodynamic process condition includes at least two of: temperature, gas atmosphere, and pressure.

15. The method as recited in claim 1, wherein the consolidating comprises sintering the powder in a second oxygen containing atmosphere at a temperature ranging from about 1200° C. to about 1700° C.

16. The method as recited in claim 15, wherein the second oxygen containing atmosphere comprises one or more noble gases.

17. The method as recited in claim 15, wherein the oxygen containing atmosphere consists essentially of oxygen.

18. The method as recited in claim 1, further comprising, prior to the consolidating: pressing the powder into a green body; and calcining the green body at a temperature ranging from about 500° C. to about 1500° C.

19. The method as recited in claim 1, further comprising spray-drying a slurry comprising the powder prior to consolidating the powder.

20. The method as recited in claim 19, the spray-drying comprising atomizing the slurry in an inert atmosphere and at a temperature of about 200° C.

21. The method as recited in claim 1, further comprising filtering or sieving the powder using a filter or sieve having a pore diameter less than or equal to about 50 microns.

22. The method as recited in claim 1, wherein A comprises gadolinium (Gd) and yttrium (Y), wherein a ratio of Gd to Y is in a range from about 2:1 to about 10:1.

23. The method as recited in claim 1, wherein at least one of applying the at least one thermodynamic process during the consolidating, and annealing the optically transparent ceramic in the oxygen containing atmosphere results in the optically transparent ceramic exhibiting a rise time component less than or equal to about 2 ns, and/or a timing resolution less than or equal to about 350 ps.

24. A method, comprising:
forming a powder comprising a composition with the formula: $A_hB_iC_jO_{12}$, wherein h is 3±10%, i is 2±10%, and j is 3±10%, wherein A includes one or more rare earth elements, B includes aluminum and/or gallium, and C includes aluminum and/or gallium;
consolidating the powder to form an optically transparent ceramic, wherein the consolidating comprises applying at least one thermodynamic process condition during the consolidating to reduce oxygen and/or thermodynamically reversible defects in the ceramic by sintering the powder in an oxygen containing atmosphere at a temperature ranging from about 1200° C. to about 1700° C.; and
annealing the optically transparent ceramic in an oxygen containing atmosphere at a temperature ranging from about 1000° C. to about 1900° C.

25. A radiation detection system, comprising:
at least one optically transparent ceramic scintillator comprising the formula $(Gd_{3-a-c}Y_a)_x(Ga_{5-b}Al_b)_yO_{12}D_c$, wherein a is from about 0.05 to about 2, b is from about 1 to about 3, x is from about 2.8 to about 3.2, y is from about 4.8 to about 5.2, c is from about 0.003 to about 0.3, and D is a dopant,
wherein the optically transparent ceramic scintillator has physical characteristics of being formed from a ceramic powder consolidated in oxidizing atmospheres, and
wherein the optically transparent ceramic has substantially reduced oxygen related defects and/or thermodynamically reversible defects.

26. The radiation detection system of claim 25, comprising a photodetector configured to detect light pulses from the optically transparent ceramic scintillator, wherein the photodetector comprises at least one of a photomultiplier and a silicon photomultiplier.

27. The radiation detection system of claim 25, wherein the radiation detection system is a positron emission tomography system.

28. The radiation detection system of claim 25, wherein the radiation detection system is selected from the group consisting of: a computed tomography system (CT); a positron emission tomography system (PET); a single-photon emission computed tomography system (SPECT); and combinations thereof.

29. The scintillator as recited in claim 25, wherein particles of the ceramic powder are coated with one or more organic compounds.

30. A scintillator, comprising:
$(Gd_{3-a-c}Y_a)_x(Ga_{5-b}Al_b)_yO_{12}D_c$, wherein a is from about 0.05 to about 1, b is from about 1 to about 3, x is from about 2.8 to about 3.2, y is from about 4.8 to about 5.2, c is from about 0.003 to about 0.3, and D is a dopant,
wherein the scintillator is an optically transparent ceramic scintillator, and
wherein the optically transparent ceramic scintillator has physical characteristics of being formed from a ceramic powder consolidated in oxidizing atmospheres so as to reduce one or more of: oxygen related detects and thermodynamically reversible defects.

31. The scintillator as recited in claim 30, wherein the scintillator has a rise time component less than or equal to about 2 ns, and/or a timing resolution less than or equal to about 350 ps.

32. The scintillator as recited in claim 30, wherein D comprises $Ce^{3+}$ and $Ce^{4+}$, wherein a level of transparency of the scintillator is based on an amount of at least one of $Ce^{3+}$ and $Ce^{4+}$.

* * * * *